United States Patent [19]

Gomez

[11] Patent Number: 4,681,810
[45] Date of Patent: Jul. 21, 1987

[54] FIRE-RESISTANT INTERLAYER
[75] Inventor: I. Luis Gomez, Longmeadow, Mass.
[73] Assignee: Monsanto Company, St. Louis, Mo.
[21] Appl. No.: 812,609
[22] Filed: Dec. 23, 1985
[51] Int. Cl.$^4$ .............. B32B 17/10; C08K 5/51; C08K 5/53; C08L 29/14
[52] U.S. Cl. .................. 428/429; 428/331; 428/437; 428/704; 428/920; 428/921; 524/139; 524/140
[58] Field of Search .............. 428/437, 429, 704, 920, 428/921; 524/129, 147; 525/139, 140

[56] References Cited

U.S. PATENT DOCUMENTS

| | | | |
|---|---|---|---|
| 3,640,837 | 2/1972 | Gaeth et al. | 428/332 |
| 3,734,877 | 3/1973 | Christie, Jr. | 524/147 |
| 3,841,890 | 10/1974 | Coaker et al. | 106/316 |
| 3,841,955 | 10/1974 | Cooker et al. | 428/437 |
| 3,974,316 | 8/1976 | Jacquemin et al. | 428/215 |
| 4,071,649 | 1/1978 | Jacquemin et al. | 428/215 |
| 4,136,135 | 1/1979 | Lee | 260/874 |
| 4,173,668 | 11/1979 | Hentzelt et al. | 428/34 |
| 4,537,830 | 8/1985 | Hermann et al. | 428/437 |

FOREIGN PATENT DOCUMENTS 58-120548  7/1983  Japan .

Primary Examiner—Allan M. Lieberman
Attorney, Agent, or Firm—Michael J. Murphy; William J. Farrington

[57] ABSTRACT

An interlayer of polyvinyl butyral resin containing a compatible mixture of additives dispersed therein providing fire-resistant properties thereto, said mixture comprising a plasticizer blend of (a) a char-forming component, such as an organic phosphate, and an oxygen sequestering agent, such as an organic phosphite, wherein the char-forming agent is the major constituent; (b) a nucleating agent such as fumed silica for dispersing the fire decomposition products of the interlayer; and (c) a heat reactive bonding resin such as silicone resin.

18 Claims, No Drawings

FIRE-RESISTANT INTERLAYER

CROSS REFERENCE TO RELATED APPLICATIONS

1. "Composition For Imparting Fire-Resistance To Laminating Interlayers", I. Luis Gomez, U.S. Ser. No. 812,493, Filed: Dec. 23, 1985. 2. "Fire Resistant Composition", I. Luis Gomez, U.S. Ser. No. 812,558, Filed: Dec. 23, 1985.

BACKGROUND OF THE INVENTION

This invention relates to an interlayer useful in safety glass assemblies containing an additives package for imparting fire-resistance to such interlayer.

Shatter-resistant, optically clear, laminated safety or security glass containing one or more thermoplastic interlayers between and adhered to opposing panes of glass (or to one glass panel and to another opposing rigid thermoplastic member) is well known for use principally as windows in vehicles and commercial and private buildings. When such safety glass is exposed to fire in an emergency, the glass cracks almost immediately and the interlayers usually used melt, start to drip through the cracks and flow to the base of the assembly followed often by complete burning, usually in a few minutes, depending on exposure time and flame temperature. Continued exposure results in pieces of the glass falling away and eventual disintegration of the laminate. In the absence of any window protection at all, smoke is then free to flow unchecked throughout the interior of the structure where the assemblies were mounted which increases the safety hazard to occupants who might be trapped therein. Furthermore, the absence of any barrier to the outside atmosphere permits oxygen to feed the fire to aggravate the conflagration.

Attempts to overcome this have involved the use of wired glass where a wire mesh is employed to provide strength to the window panel during fire exposure but the visually apparent wire mesh tends to detract from the aesthetics of the window. Interlayers, believed to be inorganic, and gels are offered commercially as substitutes for conventional interlayers in safety glass windows which are designed to foam in place between the glass panes when the assembly is exposed to fire to provide fire resistance to the laminate. These special interlayers and gels are very costly and in normal, non-fire use have more color (yellowness) and reduced weatherability (i.e. resistance to UV light) than do conventional safety glass interlayers.

SUMMARY OF THE INVENTION

Now, however, improvements have been made which minimize the susceptibility of safety glass assemblies to deterioration during exposure to elevated temperatures encountered in emergency fire conditions.

Accordingly, it is a principal object of this invention to preserve the integrity of laminated safety glass assemblies during exposure to high heat fire conditions by providing fire-resistant properties to the interlayer used in such assemblies.

An additional object of this invention is to provide an optically transparent, fire-resistant interlayer of plasticized polyvinyl butyral (PVB) useful in laminated safety glass assemblies.

Another object of this invention is to provide such a fire-resistant interlayer which is no more smoke toxic on decomposition at high temperatures than is a plasticized PVB interlayer without fire-resistant properties.

These and other objects are accomplished by providing an interlayer of PVB resin containing a compatible mixture of additives providing fire-resistant properties thereto, such mixture comprising (a) plasticizer blend which includes a char-forming component, which is preferably an organic phosphate, and an oxygen sequestering agent, which is preferably an organic phosphite, wherein the charforming component is the major constituent; (b) a nucleating agent, which is preferably fumed silica, for dispersing the fire decomposition products of the interlayer; and (c) a heat reactive, preferably silicone, bonding resin.

DETAILED DESCRIPTION OF PREFERRED EMBODIMENTS

The plasticizer blend of the additives package serves multiple functions in the invention. First, it is compatible with and conventionally functions in the usual way to plasticize the matrix polymer resin of the interlayer in which it is dispersed, insofar as improving flow and processability of such resin. Second, it acts as a sequestering agent for and consumer of oxygen during burning to control initial combustion of the interlayer containing the additives package during exposure to fire conditions. Third, the by-product produced by thermal decomposition on exposure to such elevated fire temperature conditions contributes to polymer cross-linking and char or carbon formation which survives the fire as opposed to burning completely.

The plasticizer component capable of fulfilling the foregoing plural functions is preferably a blend of organic phosphate and organic phosphite compounds.

The organic phosphate component, the primary plasticizer for the resin of the interlayer, is present as the major constituent of the blend and, importantly, is believed to decompose to phosphoric acid and contribute with the matrix polymer to form char on decomposition during fire exposure. Functional organic phosphate compounds include those disclosed in U.S. Pat. No. 3,841,890, col. 2, line 12 through col. 3, line 6, the content of which is incorporated herein by reference. The preferred organic phosphates are tri-butoxyethyl phosphate, available from FMC Corporation, Philadelphia, Pa. and isodecyl diphenyl phosphate, available from Monsanto Company as Santicizer ®148.

Char formation may be enhanced by including in the additives package certain compatible phosphatebased fire retardant additives which per se are not considered plasticizers. Typical of these are high molecular weight phosphorinone-based products available from Monsanto Company under the trademark Phosgard. These should be used at a level of about 3-5 parts per 100 parts matrix polymer. Products of decomposition of these materials under fire conditions serve to increase the level of phosphate in the formulation available for char formation.

To improve the lubricity of the plasticized interlayer composition and promote melt flow, a conventional non-phosphate plasticizer which does not promote charring may be used in replacement of some of the organic phosphate as long as sufficient of the latter (along with the phosphite described hereafter) is present to promote the char which contributes to the mechanism of the invention. Typical of such nonphosphate plasticizers are: triethylene glycol di-(2-ethyl butyrate), dihexyl adipate, dioctyl adipate, mixtures of heptyl and nonyl adipates, dibutyl sebacate, polymeric plasticizers such as the oil-modified sebacid alkyds, and mixtures of adipates and alkyl benzyl phthalates such as disclosed in U.S. Pat. No. 4,144,217.

The organic phosphite component, present as a minor constituent in the plasticizer blend, in addition to being a plasticizer, consumes oxygen during the initial phase of combustion and in doing so oxidizes to phosphate which eventually decomposes to phosphoric acid to complement the organic phosphate component referred to above in contributing to char formation. In addition, it assists during melt processing insofar as promoting thermal stability and minimizing breakdown of the matrix polymer. Functional organic phosphite compounds comprise tris(isopropyl) phosphite, tris(decyl) phosphite, tri(isodecyl) phosphite, didecyl(aryl) phosphite, available as CH300 from Interstab/Akzo Chemie of New Brunswick, N.J., tris(nonylphenyl) phosphite, triisooctyl phosphite, mixtures thereof and the like.

Oxygen sequestering may be enhanced by including in the additives package certain compatible antioxidants which likewise are not plasticizers per se but which complement the oxygen-scavenging function of the phosphite component. Typical of these are hindered, low volatility, high molecular weight phenolics available from Ciba Geigy under the trademark Irganox ®.

When the resin of the interlayer in which the additives package is dispersed is polyvinyl butyral (PVB), it is desirable to include disodium phosphate in the formulation at 300–1500 parts per million of PVB to control ph during melt processing in forming the interlayer sheet. This sodium compound serves as a buffer to neutralize a potential acidic condition which can cause some high temperature decomposition of the PVB. Further details of this are disclosed in U.S. Pat. No. 4,027,069, Examples 2–4.

The weight proportion of phosphate plasticizer to phosphite plasticizer in the plasticizer blend should be between 7:1 to 13:1, preferably between 8:1 to 10:1. The amount of phosphate and phosphite plasticizer blend present with the nucleating agent and heat reactive bonding resin (further described hereafter) which, in combination, comprise the fireresistant additives package of the invention, should be between about 80 to about 90 and preferably 85 to 88 weight % of the additives package.

The nucleating agent of the additives package functions when char from plasticizer and polymer decomposition forms at elevated flame temperatures insofar as promoting dispersion of such char-forming decomposition products which survive fire and form a ceramic-like network joining opposing panes of glass. This network minimizes excess glass cracking and promotes the structural integrity of the assembly. In this respect, small bubbles are noted throughout the expanse of the interlayer during char formation which are believed to be the nucleating agent around and within which the char is being formed. Without the nucleating agent, charring is irregular, large bubbles are noted and bonding of the network to the glass is weak and irregular. In addition, it has been observed that the presence of the nucleating agent in an interlayer composition of polyvinyl butyral shifts the exotherm peak obtained by differential thermal analysis in the 600° C. region upward by about 30° C. This supports the fire-resistance improvement of the invention achieved using the nucleating agent of the additives package.

The nucleating agent of the invention should have a refractive index which is within ±0.03 of the plasticized formulation to avoid imparting any significant haze to the interlayer in which it is dispersed. To fulfill its dispersing function, it should not decompose before glass melting occurs at the elevated fire temperature conditions. Porous, finely divided, high purity, fumed, inorganic, silica ($SiO_2$) is the preferred nucleating agent. Commercially available Cab-O-Sil ®M-5 from Cabot Corp. having a primary particle size of 0.014 microns, a refractive index of 1.46 and a purity of 99.8% functions well as the nucleating agent in the invention. Syloid ®244 from W. R. Grace Co. and Aerosil from Degussa are fumed silicas which are also functional in the present invention.

The amount of nucleating agent present in the fire-resistant additives package should be between about 2 to about 8 and preferably 2 to 5 weight %, based on the combined weight of nucleating agent, plasticizer blend and bonding agent.

The heat reactive bonding resin component of the fire-resistant additives package functions in the early stages of fire exposure at interlayer temperatures on the order of about 250° C., i.e. before decomposition of the plasticizer and matrix polymer occurs. At such temperatures the bonding resin cross-links with itself and heat sets thereby preventing significant flow of the matrix polymer and plasticizer constituents. Without a bonding resin, the constituents of the interlayer composition will melt and drip to the bottom of the assembly. To avoid contributing haze or detracting from the strength properties of the interlayer, the bonding resin should have essentially the same refractive index as the plasticized matrix polymer and preferably should not react with such matrix polymer. When the interlayer matrix resin is PVB, a heat reactive silicone resin with bonding properties has been found functional which is available from Dow Corning as QR-4-3136.

The amount of heat reactive bonding resin in the fire-resistant additives package of the invention should be between about 2 to about 2.6 and preferably 2.1 to 2.3 wt. %, based on the combined weight of plasticizer blend, nucleating agent and bonding agent.

The resin used as matrix for the fireresistant additives package of the invention must be compatible therewith and be capable of formation into an optically clear interlayer film which can be heat laminated to glass to form a shatter-resistant, safety glass assembly. Examples of such resins include polyvinyl acetals such as polyvinyl butyral, poly(ethylene-vinyl acetate), poly(ethylene-vinyl acetate-vinyl alcohol), poly(ethylene-methyl methacrylate-acrylic acid), etc. Polyvinyl butyral, well known to those skilled in the art, is the preferred resin.

In general, the preferred PVB resins have Staudinger molecular weights from about 50,000 to 600,000 and preferably 150,000 to 270,000 and may be considered to be made up, on a weight basis, of from 5 to 25 percent hydroxyl groups, calculated as polyvinyl alcohol, 0 to 4 percent acetate groups, calculated as polyvinyl acetate, and the balance substantially butyral. The PVB preferably contains, on a weight basis, from 10 to 25 percent hydroxyl groups, calculated as polyvinyl alcohol, and from 0 to 3 percent acetate groups, calculated as polyvinyl acetate, the balance being substantially butyraldehyde acetal.

PVB resin useful herein is available from Monsanto Company as Butvar ®resin. It may be produced by known aqueous or solvent acetalization processes wherein polyvinyl alcohol (PVOH) is reacted with butyraldehyde in the presence of an acid catalyst followed by neutralization of the catalyst, stabilization and drying of the resin.

With PVB as the matrix resin of the interlayer, the fire-resistant thermoplastic composition resulting from mixture therewith of the compatible additives package of the invention comprises about 38 to about 46 and preferably 39 to 41 parts by weight of such additives package per 100 parts of PVB resin. The amount of the additives package usable with other interlayer resins may vary from the above levels. If the matrix resin is a low viscosity material (e.g. polyvinyl acetate) the amount will be less than for a high viscosity material such as PVB.

In addition to the fire-resistant additives package of the invention, the thermoplastic composition containing such additives package and the interlayer film formed therefrom may contain additional additives such as dyes, ultraviolet light stabilizers, glass adhesion-control salts and the like.

The invention is further described with reference to the following Examples which are for illustration only and are not intended to imply any limitation or restriction on the invention. Unless otherwise indicated, all percentages are on a weight basis.

EXAMPLE 1

This comparative Example illustrates performance of conventional laminated safety glass not according to the invention under simulated fire conditions.

Using standard laminating techniques familiar to those skilled in the art, safety glass laminates (15.2 cm × 45.7 cm) were prepared of two sheets of float glass sandwiched around a 0.76 mm thick interlayer of Saflex®SR available from Monsanto Co. The matrix polymer of this interlayer was PVB containing 18-20% residual hydroxyl groups measured as PVOH in which was dispersed dihexyl adipate plasticizer (37 parts per 100 parts PVB). The optically clear interlayer of the laminates measured 2-3% haze as determined by Hunter D54 spectrophotometer. Fire resistance, according to ASTM-E162-81a flame propagation test, was examined by exposing the laminates to a radiant heating panel at 538° C. for 20 minutes in an electric furnace. During exposure, the laminates were observed for performance (integrity of the assembly, flame propagation, charring rate) through a window in the furnace. Significant flames from the interlayer were noted; the glass panes fragmented into pieces and the interlayer melted and accumulated at the base of the assembly. The stack temperature (i.e. that of the interlayer decomposition gases) was 410–415° C. At the end of the exposure cycle, the laminate samples were removed from the furnace and inspected for integrity. The control laminates of this Example containing conventional Saflex®SR interlayer showed only a small amount of melted interlayer at the bottom of the laminate, the major amount thereof having completely burned and vaporized, leaving both glass panes badly cracked.

As a quantitative measure of residual components, thermogravimetric scans (TGA), at a scan rate of 40° C./min. were run on 100 mg samples of the unlaminated interlayers of this Example and the amount of residuals remaining at various elevated temperatures was used to assess fire resistance of the interlayer formulation. The following results were obtained:

|  | % Weight Residuals At °C. | | |
| --- | --- | --- | --- |
|  | 500 | 590 | 950 |
| SR Interlayer | 5.14 | 0 | 0 |

This control Example illustrates the lack of fire-resistance of conventional safety glass assemblies containing commercial grade plasticized PVB interlayer.

EXAMPLE 2

This Example illustrates the improved fire-resistant composition and interlayer of the invention obtained using the fire-resistant additives package with PVB resin.

The fire-resistant compositions containing the additives package described hereafter in this Example 2 were prepared by mixing PVB resin used in the interlayer of Example 1 with the constituents of the additives package in a high intensity laboratory mixer (Diosna from Papenmeier) at about 800 rpm. until the temperature of the mixture reached 65.6° C. To promote dispersion, the solids portion of the composition (i.e. PVB resin, bonding resin, nucleating agent and buffer component) were initially premixed in such mixer for about 1 min. prior to addition of the liquid plasticizer blend. To improve lubricity, glycerol monoricinoleate at 1 part per 100 parts of PVB (phr) was included. After cooling in a jacketed low shear blender, the mixed composition in crumb form was melted in a two-stage vented laboratory extruder and formed into a ribbon using a conventional die roll shaping system from which were pressed 0.76 mm thick interlayer sheets.

| The fire-resistant composition used was: | |
| --- | --- |
| PVB | 100.00 parts |
| Isodecyl diphenyl phosphate | 25.00 parts |
| Dihexyl adipate | 10.00 parts |
| Tridecyl phosphite | 2.50 parts |
| Fumed silica (Cab-O-Sil ® M-5) | 2.50 parts |
| Heat set silicone resin (QR-4-3136) | 1.00 parts |
| Disodium phosphate | 0.05 parts |
| Glycerol monoricinoleate | 1.00 parts |

The haze level of the resulting interlayer was measured at 3–5% which is comparable with the conventional, non-fire-resistant film of Example 1.

15 cm by 45.7 cm laminates with two layers of glass were formed and exposed to simulated fire conditions as in Example 1. Visual examination during the burning period and thereafter revealed:

(i) significantly reduced flaming of the interlayer in comparison with Example 1 as corroborated by a stack temperature of 320° C. which was almost 100° C. below that of the non-fire resistant control.

(ii) some longitudinal cracks but no fragmentation in the glass pane facing the radiant panel where volatile constituents of the interlayer necessarily escaped; no cracks were present in the other outer pane of glass facing away from the radiant furnace panel. This is interpreted to mean that the glass pane of the laminate assembly furthest from or outermost of the side facing an actual fire would in use remain essentially intact.

(iii) a charred, black, relatively uniform interlayer residue between the glass panes occupying about 80% of the original area of the initial unburnt interlayer. This very importantly shows that the structural integrity of the laminate was preserved. Small bubbles of approximately uniform size were relatively uniformly dispersed throughout the charred formation which were considered to be the silica component functioning to disperse the char formed primarily by the burnt plasticizer component and matrix polymer.

(iiii) that when the two pieces of glass of a laminate were manually pulled away from either side of the charred interlayer formation, a weak ceramiclike network across the thickness of the charred interlayer was present which appeared to have joined and held the two panes of glass together.

TGA scans as in Example 1 were run on the interlayer of this Example 2 in conjunction with a mass spectrometer to determine the analysis of the gases given off during pyrolysis. The volatiles noted consisted of the following: $CO_2$, water, butanal, acetic acid, propene, formaldehyde, butene, benzene and butanoic acid. These volatiles were considered to be representative of and essentially no more toxic than those generated by the non-fire-resistant Saflex ®SR interlayer of Example 1.

In terms of residual components versus temperature, the results of the TGA scans of the invention interlayer of this Example 2 were as follows:

| | % residuals at °C. | |
|---|---|---|
| 500 | 590 | 950 |
| 19.8 | 18.0 | 8.0 |

These TGA results show a significant level of char remaining in simulated fire conditions.

EXAMPLE 3

This control Example illustrates the function of the silica in the fire resistant additives package of the invention.

The PVB formulation of Example 2 was prepared except in the absence of dihexyl adipate and the silica component. When the laminates were examined after the simulated fire test, significant cracking in both glass panes was noted; bubbles associated with the silica were large and less uniformly dispersed throughout the char formation than in Example 2. The integrity of the laminates was considered poor.

The safety glass assemblies in which the fire-resistant interlayer of the invention is functional comprise two sheets of glass laminated to each side of the interlayer. For exceptional fire resistance two or more interlayer components can be included, each of which is positioned between contiguous layers of glass- i.e. the following layer sequence for an assembly containing two fire resistant interlayers: glass/interlayer/glass/ interlayer/glass. Though assemblies with plural glass layers are preferred, the interlayer of the invention can be used in a bilayer system with only a single layer of glass. In such a bilayer system, melting, dripping and burning of the interlayer is significantly retarded thereby offering some protection to occupants of the surrounding area.

While certain specific embodiments of the invention have been described with particularity herein, it will be recognized that various modifications thereof will occur to those skilled in the art. The scope of the invention, therefore, is to be limited solely by the scope of the following claims.

I claim:

1. An interlayer of polyvinyl butyral resin containing a compatible mixture of additives dispersed therein providing fire resistant properties thereto, said mixture comprising:

(a) a plasticizer blend of a char-forming component capable of contributing with the polyvinyl butyral resin to char formation on decomposition of the interlayer during fire exposure and an oxygen sequestering agent of consuming oxygen during fire exposure of the interlayer, wheren the char-forming component is the major constituent;
    (b) a nucleating agent for dispersing fire decomposition products of the interlayer; and
    (c) a heat resistant bonding resin.

2. The interlayer of claim 1 wherein the char-forming agent is an organic phosphate.

3. The interlayer of claim 1 wherein the oxygen sequestering agent is an organic phosphite.

4. The interlayer of claim 1 wherein the nucleating agent is fumed silica.

5. The interlayer of claim 1 wherein the bonding resin is a silicone resin.

6. The interlayer of claim 1 wherein the ratio of char-forming component to sequestering agent in the blend is between 7:1 and 13:1.

7. The interlayer of any of claim 1, 2, 3, 4, 5 or 6 wherein the amount of the mixture is between about 38 to about 46 parts by weight per 100 parts of resin.

8. The interlayer of claim 7 wherein the mixture includes:

(i) 80 to 90 weight % plasticizer blend;
    (ii) 2 to 8 weight % nucleating agent; and
    (iii) 2 to 2.6 weight % heat reactive bonding resin.

9. The interlayer of any of claims 1, 2, 3, 4, 5 or 6 including two sheets of glass laminated to each side of the interlayer.

10. The structure of claim 9 including a second interlayer laminated to the side of one of said sheets of glass which is not in contact with the interlayer of claim 9 and further including a third sheet of glass laminated to the other side of said second interlayer.

11. An interlayer of polyvinyl butyral resin containing a compatible mixture of additives dispersed therein providing fire resistant properties thereto, said mixture comprising:

(a) a plasticizer blend of organic phosphate and organic phosphite constituents wherein the organic phosphate is the major constituent;
    (b) fumed silica; and
    (c) a heat reactive bonding resin.

12. The interlayer of claim 11 wherein the organic phosphate is selected from the group consisting of tributoxyethyl phosphate, isodecyl diphenyl phosphate and mixtures thereof.

13. The interlayer of claim 11 wherein the bonding resin is a silicone resin.

14. The interlayer of claim 11 wherein the organic phosphite is selected from the group consisting of triisoprop-yl phosphite, tri-decyl phosphite, didecyl (aryl) phosphite, and mixtures thereof.

15. The interlayer of any of claim 11, 12, 13 or 14 wherein said mixture includes:

(i) 80 to 90 weight % plasticizer blend;
    (ii) 2 to 8 weight % fumed silica; and
    (iii) 2 to 2.6 weight % heat reactive bonding resin.

16. The interlayer of claim 15 wherein the ratio of organic phosphate to organic phosphite is between 7:1 and 13:1.

17. The interlayer of claim 15 including two sheets of glass laminated to each side of the interlayer.

18. The structure of claim 17 including a second interlayer laminated to the side of one of said sheets of glass which is not in contact with the interlayer of claim 16 and further including a third sheet of glass laminated to the other side of said second interlayer.

* * * * *